United States Patent [19]
Körber et al.

[11] 4,316,175
[45] Feb. 16, 1982

[54] METHOD FOR THE ADVANCE INDICATION OF DAMAGE TO WHEEL BEARINGS

[75] Inventors: Joachim Körber, Weinheim an der Bergstrasse; Günter Bange, Mannheim; Walter Poll, Sennfeld; Volker Bensberg Kaltenbach; Hans Pittroff, Schweinfurt, all of Fed. Rep. of Germany

[73] Assignee: SKF Kugellagerfabriken GmbH, Schweinfurt, Fed. Rep. of Germany

[21] Appl. No.: 920,147

[22] Filed: Jun. 29, 1978

Related U.S. Application Data

[63] Continuation-in-part of Ser. No. 912,345, Jun. 5, 1978, which is a continuation of Ser. No. 710,387, Aug. 2, 1976, abandoned.

[30] Foreign Application Priority Data

Jan. 26, 1977 [DE] Fed. Rep. of Germany ....... 2703071
Jan. 12, 1978 [AT] Austria ......................................... 226

[51] Int. Cl.³ .......................... G01K 7/16; G08B 21/00
[52] U.S. Cl. ......................................... 340/57; 73/342; 246/169 A; 340/584; 340/682
[58] Field of Search ................. 340/57, 517, 584, 682; 73/341, 342; 246/169 R, 169 A, 169 D, DIG. 2; 364/557

[56] References Cited

U.S. PATENT DOCUMENTS

| 2,385,487 | 9/1945 | Baughman | 340/682 X |
| 2,420,968 | 5/1947 | Newell | 340/599 |
| 2,420,969 | 5/1947 | Newell | 73/342 X |
| 2,628,344 | 2/1953 | Johnson et al. | 340/682 X |
| 2,993,363 | 7/1961 | Howell | 73/1 |
| 3,582,926 | 6/1971 | Hassan | 340/57 |
| 3,587,317 | 6/1971 | Ruof | 73/342 |
| 3,646,343 | 2/1972 | Caulier et al. | 73/341 X |
| 3,719,071 | 3/1973 | Hohenberg | 73/341 |
| 3,872,456 | 3/1975 | Glazar | 340/47 |
| 3,922,640 | 11/1975 | Ruof | 340/57 |

Primary Examiner—John W. Caldwell
Assistant Examiner—Joseph E. Nowicki
Attorney, Agent, or Firm—Daniel M. Rosen

[57] ABSTRACT

In a method for advance indication of the possibility of damage occurring to wheel bearings of vehicles, particularly railroad vehicles, the temperatures of the wheel bearing sets of a plurality of wheels are monitored by temperature detectors fixedly mounted on the vehicle. A determined value is derived from the measured values of temperature, and this determined value is compared with the temperature of a further temperature detector, in order to produce a warning signal. The warning system is incorporated in the vehicle itself, and provides a warning to the vehicle personnel.

26 Claims, 5 Drawing Figures

METHOD FOR THE ADVANCE INDICATION OF DAMAGE TO WHEEL BEARINGS

PRIOR APPLICATION

This application is a Continuation-In-Part of application Ser. No. 912,345 filed June 5, 1978, which was in turn a continuation of application Ser. No. 710,387 filed Aug. 2, 1976, now abandoned.

BACKGROUND OF THE INVENTION

This invention relates to a method for and apparatus for the advance indication of the possibility of damage occurring to wheel bearings. The invention is particularly adaptable for rail vehicles, such as railway cars, and to the determination of the possibility of damage to the bearings of the wheel sets of such vehicles. In the following disclosure, it will be apparent that reference to wheel bearings refers primarily, although not exclusively, to the wheel set bearings of rail vehicles.

In order to identify so-called "hot boxes" in railway vehicles, in accordance with known systems warning devices are positioned along the section lines. These warning devices detect the heat radiation, such as infrared radiation, of the wheel bearings of passing vehicles, and convert the radiation to electric signals. These signals are then applied to electronic evaluation systems. The temperature measurement employed in these techniques is a temperature difference measurement, since either a comparison of the temperature between two wheel sets that are opposite one another, or behind one another on the vehicle is made. If the temperature difference between two wheel sets deviates a determined amount from the temperature difference of the remaining wheel sets of the railway vehicle, then a condition of "hot running", or a "hot box" is indicated. The electronic computer evaluates the information from the detectors, and transmits it to an indicator or display at the closest signal box or station. At the same time, an acoustic signal is produced at the signal box or station.

Monitoring systems of this type, employing stationary installations, are no longer adequate, due to the ever increasing speed of the railway vehicles, and it is especially apparent that such systems cannot provide early warnings of possible damage for fast moving vehicles. As the speed of travel of the vehicles increases, the load on the wheel bearings also increases greatly. In order to avoid damage, changes in the characteristics of the mechanical portions of the wheel bearing systems must be ascertained and indicated as early as possible. Such changes result, as a rule, in a change of the temperature of the wheel bearings. Consequently, it is essential to provide a temperature control system that is directly mounted on the vehicle to monitor the temperature of the wheel bearings, and it must include a telecommunication system to indicate the possibility of damage directly to the railway personnel, for example, personnel in the locomotive.

German Patent Publication DT OS2,152,495 discloses a wheel bearing monitoring arrangement, employing a temperature detecting receiver fixed to the vehicle for determining the wheel bearing temperature, the system including means for producing a warning signal when the output of the receiver exceeds a given limit value. In this system, the measuring data relating to the wheel bearing temperatures, for producing the alarm signal, is obtained from at least two separate temperature receivers, in order to provide a difference value which is related to the wheel bearing temperature and the ambient temperature.

The technique of measuring the wheel bearing temperature and comparing it with the ambient temperature as a reference signal is very dependent upon outside influences, especially, for example, in tunnels through which the railway vehicle may be passing, or in regions where there is a large amount of solar radiation. Such known monitoring arrangements, furthermore, do not detect functional, technical changes in the wheel bearings. This can lead to damage of the wheel bearings, even though the measured outer ring temperature of the bearings has a positive correlation to the temperature of the entire bearing, as can be shown by calculations.

The following critical changes can also occur in the wheel bearings:

(1) Initial stress of the rotating bodies

The temperature distribution and a temperature drop in the bearing between the inner and outer rings are not dangerous, as long as an acceptable bearing clearance in the bearing does not lead to an initial radial stress in the rolling bearing. In the initial stress region, that is, with negative bearing clearance, the temperature progressively increases. In the limit case, the temperature will no longer be capable of being maintained in an equilibrium state.

(2) Dissipation

As the velocity of the vehicle increases, the power dissipation of the wheel bearing also increases. This results in an automatic increase in the temperature of the wheel bearing. Temperature increases of this type are not dangerous, as long as they result in equilibrium of the temperature in the bearing, and the height of the temperature as well as the time duration of high temperatures exerts no disadvantageous effects on the lubricant of the bearings.

(3) Ambient temperature

The temperature of the wheel bearings and the quantity of heat produced in the bearings are dependent upon the ambient temperature. When the lubricant viscosity increases at low temperatures, the quantity of heat produced is larger, and this will consequently result in increases in the temperature gradient between the inner and outer rings of the bearing. The danger of radial stresses in the bearing due to the preloading stress of the rotating bearings is greater in winter, when there are low ambient temperatures, than in summer when the ambient temperatures are higher.

(4) Lubrication

The conditions of the lubricant, such as grease or oil, in the bearing characterizes the temperature performance of the bearing. The lubricant conditions depend on the amount of the lubricant as well as upon the quality of the lubricant. High viscosity lubricants result in an increased churning action in a bearing, and also consequently in an increase in the temperature. This fact is well-known in the use of lubricants. When the lubricant has a low viscosity, and a smaller quantity of lubricant is employed, the optimum running temperature is attained. This condition, however, is unstable, and is therefore dangerous. A reduction in the amount of lubricant in the bearing manifests itself initially positively in a decreased temperature, following which the temperature then rises continuously due to the need of further lubricant.

SUMMARY OF THE INVENTION

The present invention is directed to the provision of a method and apparatus wherein advance indication is given of the need for lubrication of the wheel bearings, and hence consequently, of the danger of possible damage to the wheel bearings. The invention employs temperature detecting means for monitoring the temperature of the wheel bearings and producing signals, directly on the railway vehicle. The invention is further directed to substantially eliminating other influences, such as for example, the fact that the heat transfer from an inner bearing element to an outer bearing element is less efficient at low ambient temperatures than at high ambient temperatures, due to the resultant increased viscosity of the lubricant. In addition, the invention is directed to detecting all functional changes in the system of the mechanical parts of the wheel bearings.

Briefly stated, in accordance with the invention, temperature detectors or receivers are employed on a plurality of wheels of a railway vehicle, for example, on all wheel set or assembly bearings of a train, or on all wheel set bearings of a truck of a railway car. A determined value is derived from the temperature monitoring of all of a given plurality of wheel bearings, this determined value being, for example, the maximum value of the readings, or the average value of the readings. The determined value is compared with the temperature detected by another temperature detector on the railway vehicle to result in the production of an output signal when the last mentioned detected temperature exceeds the determined value by a determined amount.

The invention may be comprised of the measured values of the temperature pickups disposed on the wheel-assembly or set bearings are applied to the first comparator, where they are compared and the maximum temperature value $\theta$ max is selected from among said values. This selected value is applied to the second comparator, where the difference $\Delta\theta$ between said maximum (or mean) value and the output value of the function generator is determined. The reference value $\theta_{RF}$ is derived in the function generator as a function of the outside temperature. An output signal is triggered in the second comparator when a certain difference value $\Delta\theta$ is exceeded.

The function generator is coupled to an additional temperature pickup, which may be mounted on the truck or the vehicle itself, for example, so that the comparison with the maximum value or the mean value of the temperature of all wheel-assembly bearings results in an output responsive to exceeding a certain limiting or threshold value. The threshold value is variable and is a function of variation in the temperature sensed by the additional temperature pickup on the rail vehicle or wheel truck.

By sensing and comparing the temperature of the large mass of the rail vehicle or truck, a substantially invariant temperature value, related to the ambient temperature, is used as basis of comparison. The entire mass of the rail vehicle or truck represents a more nearly constant heat source than the ambient air. As discussed above, in tunnels, the air temperature is considerably lower, particularly in summer, than outside of the tunnel, but this effect does not materially change the temperature of the vehicle or truck.

In accordance with a further feature of the invention, an additional indicator may be provided for determining the measured value of the temperature pickup of each wheel-assembly bearing and indicating each individual value as well as triggering a signal when a certain temperature light value is exceeded at one or more wheel-assembly bearings.

Thus, a WARNING signal may be given on the rail vehicle when a temperature limit (e.g., 80° C.) related to the lubricant is exceeded, and an ALARM signal may be given when a temperature limit (e.g., 120° C.) related to the thermal stabilization of the antifriction-bearing steel is exceeded.

This signal enables the ascertaining of unusual temperature rises. So long as they are related to the speed or to temporarily high ambient temperatures in summer, these unusual temperatures are of no consequence. However, if they prevail over extended periods of time, it is advisable to check the condition of lubrication of the wheel-assembly bearing. Temperature rises due to the speed or to high ambient temperatures in summer should as a rule only trigger the preliminary WARNING signal. When speed is reduced, this influence is eliminated. If the WARNING signal persists, then the high temperature in the wheel-assembly bearings must be a function of the ambient temperature. The WARNING signal may also be due to deteriorated conditions of lubrication. In either case the temperature will continue to rise then trigger the ALARM signal. When there is a change in speed, this signal will persist in both cases. To the engineer in the locomotive, this indicates that it is absolutely necessary to check the wheel-assembly bearing.

In accordance with a further modification of the invention, the first comparator may comprise means for selection of the minimum temperature value $\theta$ min and a third comparator may be electrically connected to the first comparator so that both the maximum and the minimum temperature values are fed thereto for comparison. A signal is then triggered when a temperature-difference value of a certain magnitude is present. These additional monitoring means supplement the apparatus described above to provide for cases where a substantial difference occurs between bearing-temperature values without, however, the maximum value having already reached a level which upon comparison with the outside temperature would trigger a signal. This arrangement additionally makes allowance for the effect of speed of travel and axle loading.

This arrangement enables a determination that a wheel-assembly bearing of a truck deviates in its operating behavior from the other bearings. The signal generally is due to damage to a bearing or also to deteriorated conditions of lubrication caused, for example, by insufficient lubrication. It does not mean that the temperature of a wheel-assembly bearing is higher than that of the others. It might just as easily drop below that of the others as a result of minimum-amount lubrication. When this signal is given, the rail vehicle may continue to travel, but a check should be made at first opportunity.

Accordingly to a further modification of the invention, a WARNING or ALARM signal may be triggered in an indication, depending on the magnitude of the temperature-difference value or measured temperature value applied to it.

In a still further modification, means for checking the monitoring system for proper operation may be provided, whereby the temperature pickups may be caused to heat up. Such means may consist in providing a changeover switch for every temperature pickup. The common leads of the switch may be connected to the particular temperature pickup and two outputs may be connected on the one hand to a heating-voltage bar and on the other hand to the particular input of the additional indicator as well as to the comparator.

An additional arrangement may also be provided whereby the changeover switch may be isolated from the heating voltage bar and reconnected to the comparator when the temperature pickup has reached a certain temperature level. This enables the prevention of the particular temperature pickup, that is connected to the heating-voltage bar, from heating up excessively and being damaged thereby. The switchover occurs a few seconds after the temperature pickup has reached a temperature level that is appreciably higher than the highest maximum value. This value is indicated in the indicator, and serves as a maximum value in the first comparator, and triggers a signal in the second comparator. This check may be performed manually when the vehicle is not moving. The indication in the comparator or in the indicator, respectively, is an indication of the proper operation of temperature pickups, connecting lines, and comparators. A signal of this type is appropriately given also upon the occurrence of other faults, as, for example, a short circuit in the connecting line of the temperature pickups.

Means may further be provided which in the case of other malfunctions of the monitoring system trigger a FAULT signal. This assures that the temperature monitoring apparatus is operating properly and that no false indications and hence unjustified warning signals are given.

The arrangements described above permit the detection in operation of all functional changes in the wheel-assembly bearing and the timely operation of the early detection of damage. Since these signals are given directly to the locomotive crew, it is possible for the crew to react instantly and thereby avoid damage and accidents.

BRIEF FIGURE DESCRIPTION

In order that the invention will be more clearly understood, it will now be disclosed in greater detail with reference to the accompanying drawing, wherein.

DETAILED DISCLOSURE OF THE INVENTION

Figure 1:
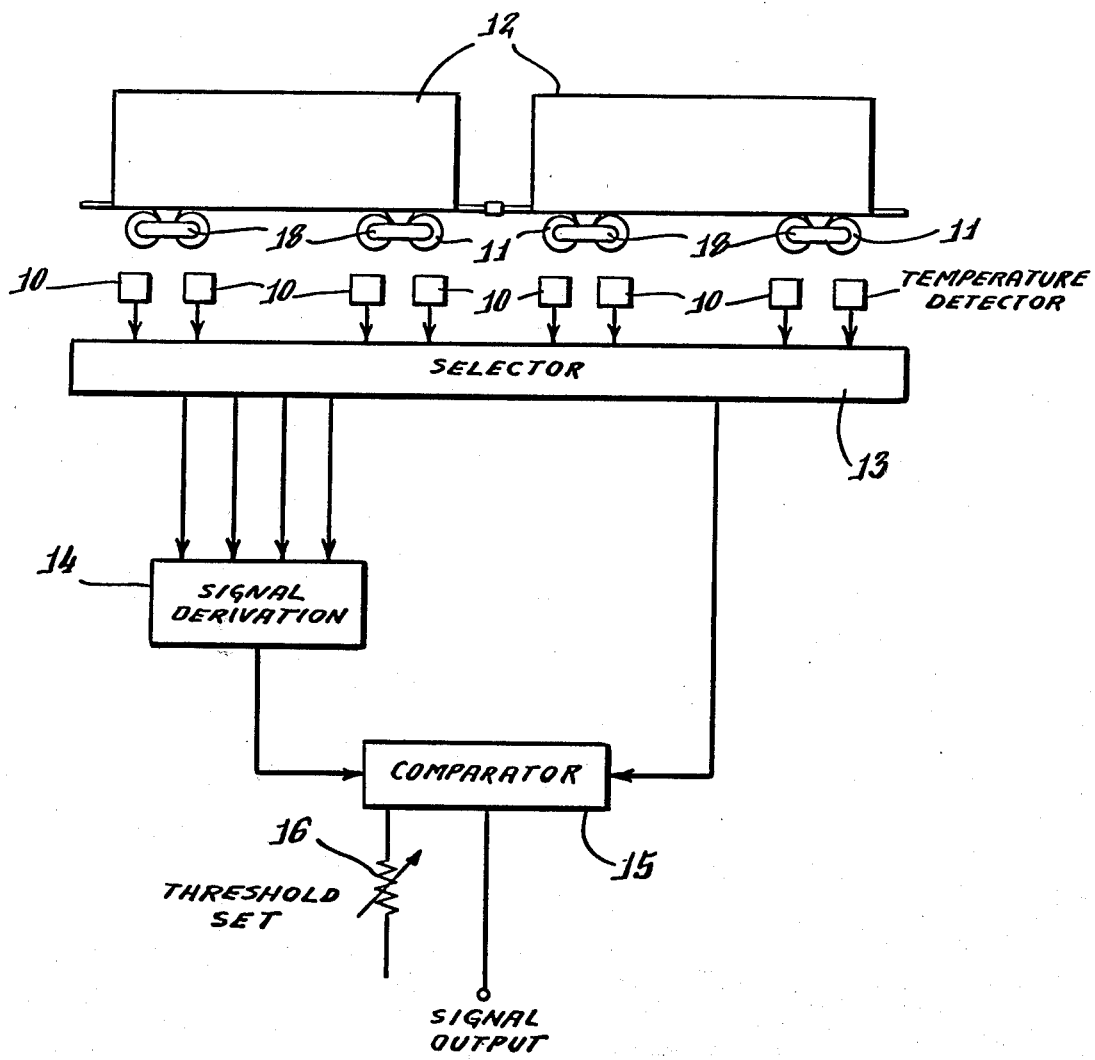
FIG. 1 is a simplified block diagram of one embodiment of the system of the invention.

Referring now to the drawings, and more in particular to FIG. 1, therein is illustrated an apparatus in accordance with the invention, for enabling the early recognition of the possibility of damage to wheel bearings, and particularly to wheel set bearings of railway vehicles, employing a temperature detector 10 mounted to monitor the temperature of each wheel bearing of a two wheel set 11 of a railway vehicle, such as the railway cars 12. The outputs of a plurality of the temperature detectors 10 are employed to derive a determined value signal. For illustrative purposes only, each of the temperature detectors 10 is connected to a selector 13 for the application of a determined group of the signals to a signal derivation circuit 14. The signal derivation circuit 14, in different embodiments of the invention, may be a circuit for determining a value corresponding to the maximum of the detected temperatures of the group, or it may provide an output signal corresponding to the average of the signals of the group. In addition, the output of one of the temperature detectors is selected for comparison in comparator 15 with the output of the signal derivation circuit 14. The comparator 15 may have a threshold value, as indicated by the threshold setting potentiometer 16, so that a signal output is produced therefrom when the single signal applied to the comparator directly from the selector exceeds the signal applied thereto from the signal derivation network by a determined threshold value.

It is apparent that the temperature detector may be of any conventional nature mounted on the railway vehicle to detect the temperature of wheel set bearings, and that the selector 13 may, if desired, be formed of switching means for selecting a determined group of the outputs of the temperature detectors. For example, the selector may select all of the temperature detector outputs for application to the signal derivation network, it may select only those related to a given truck 18 of one of the railway cars, and that the selected group may include or exclude the output of the temperature detector corresponding to the wheel bearing being monitored at any given time.

The system illustrated in FIG. 1 of the drawings is figurative only, and it will be apparent that other systems may be employed on the railway vehicle according to conventional practice. As discussed above, the measuring value of the temperature monitors or detectors of the wheel bearings of the railway vehicle, and the measuring value corresponding to the temperature or detector of the vehicle of a portion thereof, such as a truck of the railway vehicle, are detached. In accordance with one embodiment of the invention, a maximum value is derived from the wheel bearing temperature determinations, and this maximum value is compared with the output of the temperature detector affixed to the railway vehicle at one of the wheel bearings. In other words, the output of one of the temperature detectors of the railway vehicle is compared with the maximum value of a plurality of temperature detectors of wheel bearings of the railway vehicle, in order to produce an output signal.

In a further embodiment of the invention, the average of the outputs of all of the wheel bearing temperature monitors is derived, instead of the maximum value represented by such measurements, and this average or mean value is compared with the measuring value of temperature detector of the vehicle or truck. For this purpose, a conventional averaging circuit may be employed.

If the comparison of the temperature of the temperature detector, which is for example mounted on a truck of the railway vehicle, with the maximum or median value of the temperature of all of the wheel bearings produces a value that exceeds a determined value, that is, a threshold value, then an output signal is produced. Advantageously, the limiting or threshold value is variable, that is, it may be adjusted in relationship to the changes of temperature of the temperature detector located on the railway vehicle or railway vehicle truck.

By employing the temperatures of one or more rail vehicle wheels, or one or more trucks, as a comparison value, and comparing the temperature of one of the wheel bearings with this comparison value, it is apparent that the comparison is effected with relation to a relatively unchangeable temperature value, as compared with the more variable nature of the ambient temperature. Thus, a value derived from a railway vehicle or a truck of the vehicle is relatively constant, since such a mass serves as a more constant source of heat than the ambient air. As discussed above, the temperature of air in a tunnel through which a railway vehicle is passing may vary widely from the air temperature outside of the tunnel, particularly in summer. In the method and apparatus in accordance with the invention, however, the temperature value derived from a vehicle or vehicle truck, and employed as a comparison value, is thus much more constant than would be a comparison value derived from the ambient air.

Figure 2:
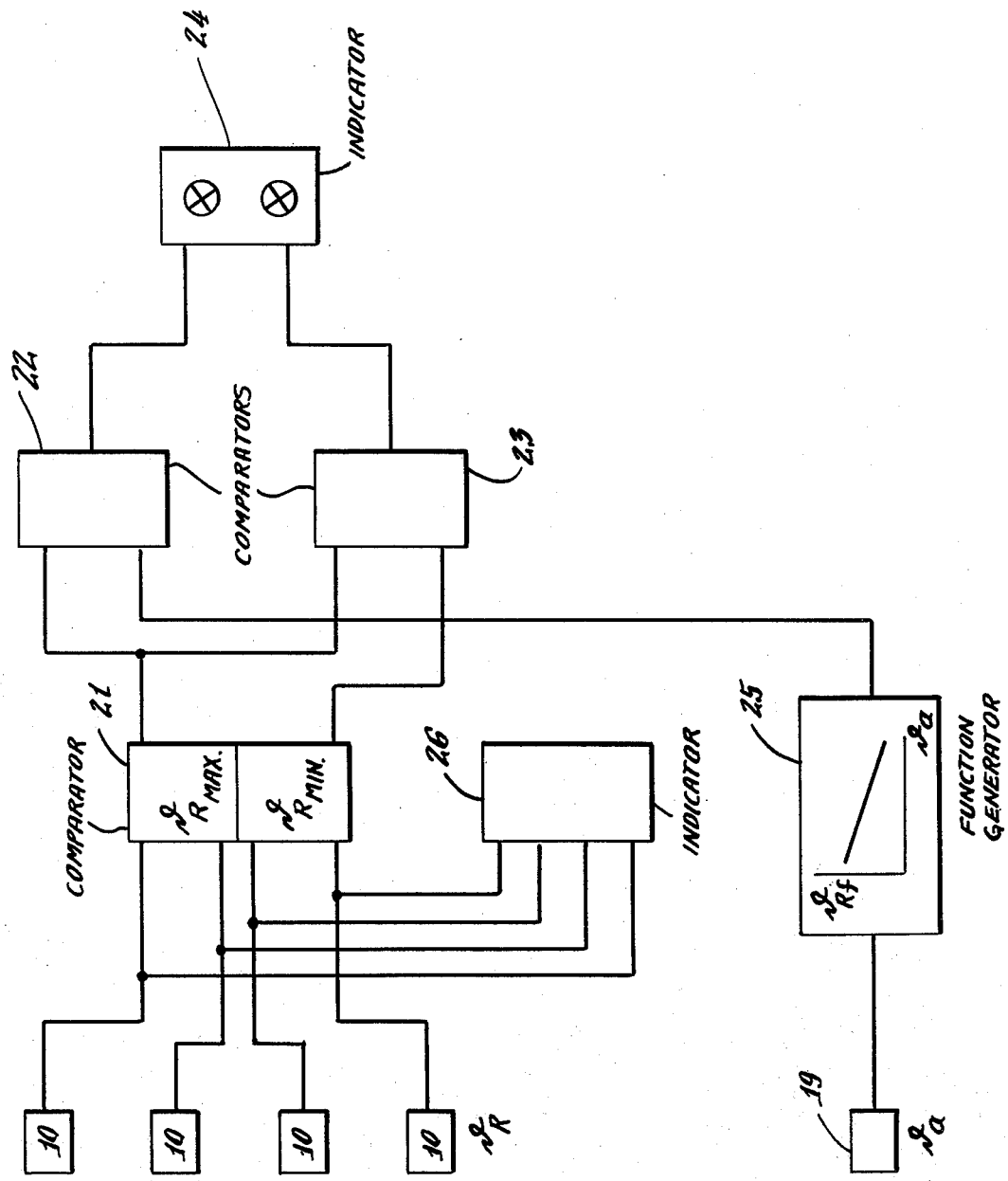
FIG. 2 is a simplified block diagram of a more detailed embodiment of the system of FIG. 1.

This feature of the invention is more clearly illustrated in the block diagram of FIG. 2, wherein the reference numeral 10 designates the temperature pickups located at the wheel bearings and the reference numeral 19 designates the temperature pickup connected to the railway vehicle or truck, in a system of the type illustrated in FIG. 1. In the arrangement of FIG. 2, the temperature pickups 10 are connected to a first comparator 21. In this comparator, the temperature values $\theta_R$ of the various wheel-assembly bearings are compared with one another and the highest value is selected and transmitted to a second comparator 22. The temperature pickup 19 is also connected to the comparator 22, which measures the outside temperature, a function generator 25 being interposed. In the function generator 25, a reference value is formed which represents the measured value $\theta_a$ of the temperature pickup 19 for the outside temperature as a function of said temperature value $\theta_a$. With rising outside temperature the reference value drops. In the second comparator 22 the difference $\Delta\theta$ between the maximum value of the measured values of the wheel-assembly bearings, $\theta_{max}$, and the reference value $\theta_{RF}$ of the function generator 25 is formed. When the difference value from comparator 22 exceeds a certain temperature limit value, a signal is triggered which is indicated in an indicator 24, for example, and signals that one of the wheel-assembly bearings is endangered.

The first comparator 21 further comprises means for selection of the minimum value from among the measured bearing temperature values. In addition, a third comparator 23 is provided which is connected to the first comparator 21 by way of two lines, one for the maximum temperature value, the other for the minimum temperature value. In the third comparator 23 the maximum temperature value is compared with the minimum temperature value. When a predetermined permissible temperature limit difference value is exceeded, an alarm signal is triggered and indicated in the indicator 24.

In addition, an indicator 26 is provided which covers the measured values of all temperature pickups of the wheel-assembly bearings and indicates each individual value, a signal being triggered when a certain temperature limit value is exceeded in one or more wheel-assembly bearings.

In other words, the indicator 26 may have separate indicating instruments for indicating the measured values separately of the wheel-assembly bearings, and in addition conventional threshold devices, such as Schmitt triggers may be employed for each of these indicators for indicating, either audibly or visually, that the determined temperature limit value has been exceeded.

Figure 3:
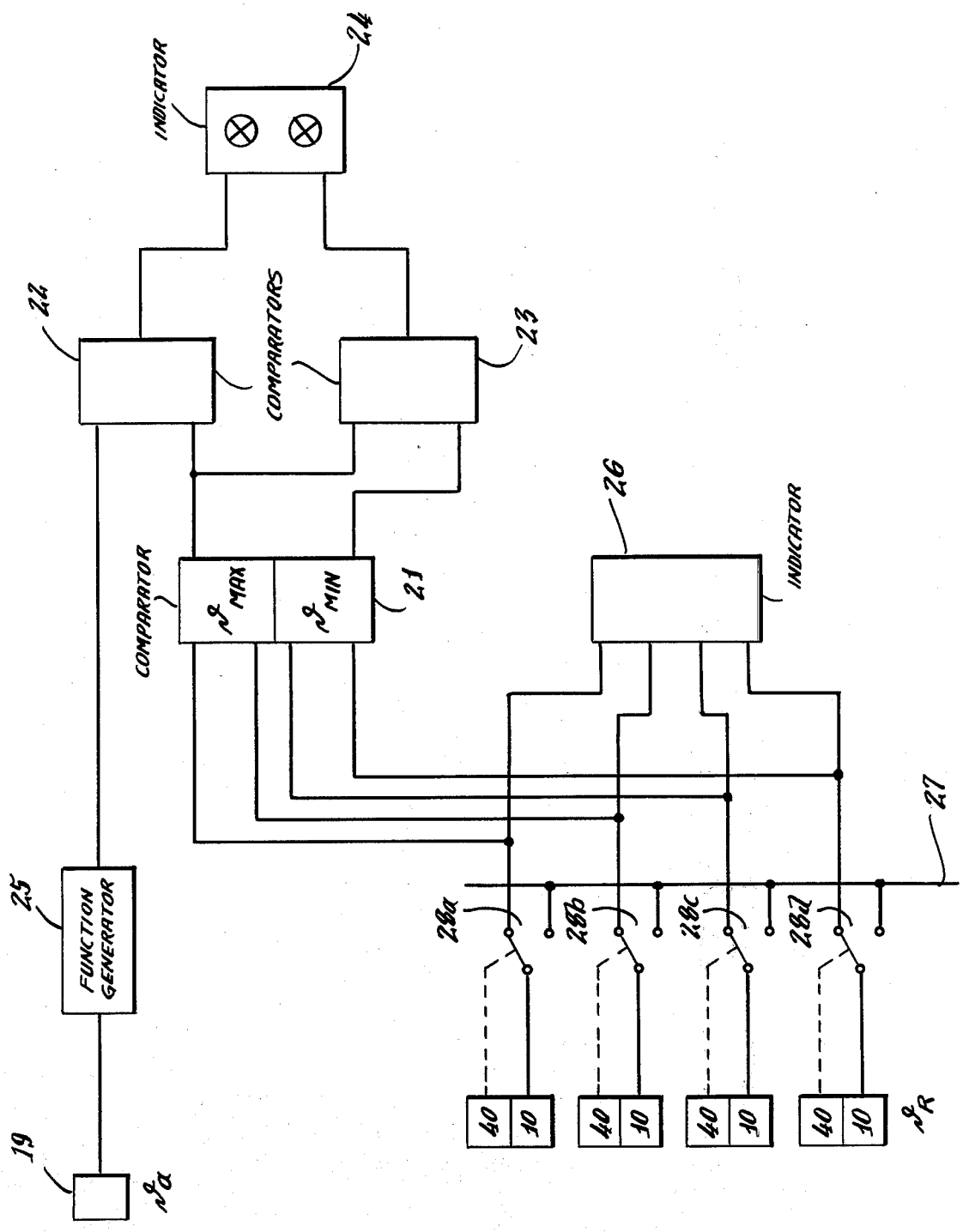
FIG. 3 is a simplified block diagram of a modification of the system of FIG. 2.

FIG. 3 shows a monitoring apparatus in accordance with the invention with further features. For each of the temperature pickups 10 this circuit comprises a changeover switch 28a–28d permitting the respective temperature pickup to be switched to a heating-voltage bar 27. When connected to the bar 27, the temperature pickup is heated by the current flowing through it, and when an individual switch of the changeover switch 28 is then switched to the temperature indicator 26 the thereby elevated temperature is indicated. The changeover switch may be manually operated, but preferably means are provided whereby it is automatically switched back from the heating-voltage bar 27 to the comparator 21 when the temperature pickup reaches a certain temperature level. The particular temperature pickup which is connected is thus caused to heat up in a very particular way and in addition damage due to overheating is prevented. The switchover occurs just a few seconds after the temperature pickup has reached a temperature that is appreciably higher than the highest maximum value. This value is indicated in indicator 26, and serves in the first comparator 21 as a maximum value, so that the second comparator 22 is triggered to produce an output signal. This check can be performed manually when the vehicle is at standstill. The indication in comparator 22 or indicator 24 is an indication of the proper operation of temperature pickups, connecting lines, and comparators 22 and 23.

The automatic operation of the changeover switches 20a–28d may be effected, for example, by thermal measuring devices 40 thermally coupled to the pickups 10, for controlling the respective changeover switches.

It is advantageous, in accordance with the invention, to enable the production of more than one type of signal, the production of any given type of signal being dependent upon determined different threshold values. For example, a signal "Warning" from the rail vehicle may be produced when the detected temperature crosses the threshold value, for example, of 80° C. This temperature limit is determined, for example, by the characteristics of the lubricant. In addition, an "Alarm" signal may be provided when the detected temperature exceeds the given temperature, for example, of 120° C., this latter value being dependent upon the heat stabilization of the steel of the rolling bearings.

With such an indication, which may be implemented by the use of suitable conventional threshold devices in the indicator 26, it is possible to detect extraordinary temperature rises. As long as the rises are related to speed or to passing incidentally high ambient temperatures, for example, in summer, extraordinary temperatures are without significance. If the high temperatures are observed over long time periods, then it is advisable for the personnel of a railway vehicle to examine the condition of the lubricant of the wheel bearings. Temperature rises following high speeds or high ambient temperatures, in summer, should thereby as a rule only produce the "Warning" signal. If the speed of the vehicle is reduced, then the influence of this factor ceases. If, on the other hand, the signal remains following the reduction of speed, then the high temperature in the wheel bearing must be dependent upon the ambient temperature. This warning indication can also be a result of radial deformation in the bearing, or a result of deteriorating lubricant conditions. In both cases, the temperature will further increase, and the "Alarm" signal will eventually be produced. A change of speed of the vehicle will, in both cases, not result in a change in the indication. This is therefore an indication to the locomotive personnel that an examination of the wheel bearings is a necessity.

According to a further embodiment of the invention, the measuring value of the temperature receiver or detector of all of the wheel bearings are detected, and compared with one another, to produce an additional alarm signal when the detected temperature difference exceeds a given threshold level from the compared values. With this feature, which can also be implemented by the use of conventional comparators and threshold devices, it can be ascertained when a wheel bearing of one truck differs in its functional characteristics from the other bearings. The indication is, in general, a result of bearing damage, or deterioration of the lubricant, for example, due to low lubricant level. This does not mean that the temperature of a wheel bearing is higher in proportion to the remaining bearings. It can just as well deviate as a result of the use of low grade oil. When this indication is given and the railway vehicle is to travel further, the condition of the bearings should be inspected at the next opportunity.

Figure 4:
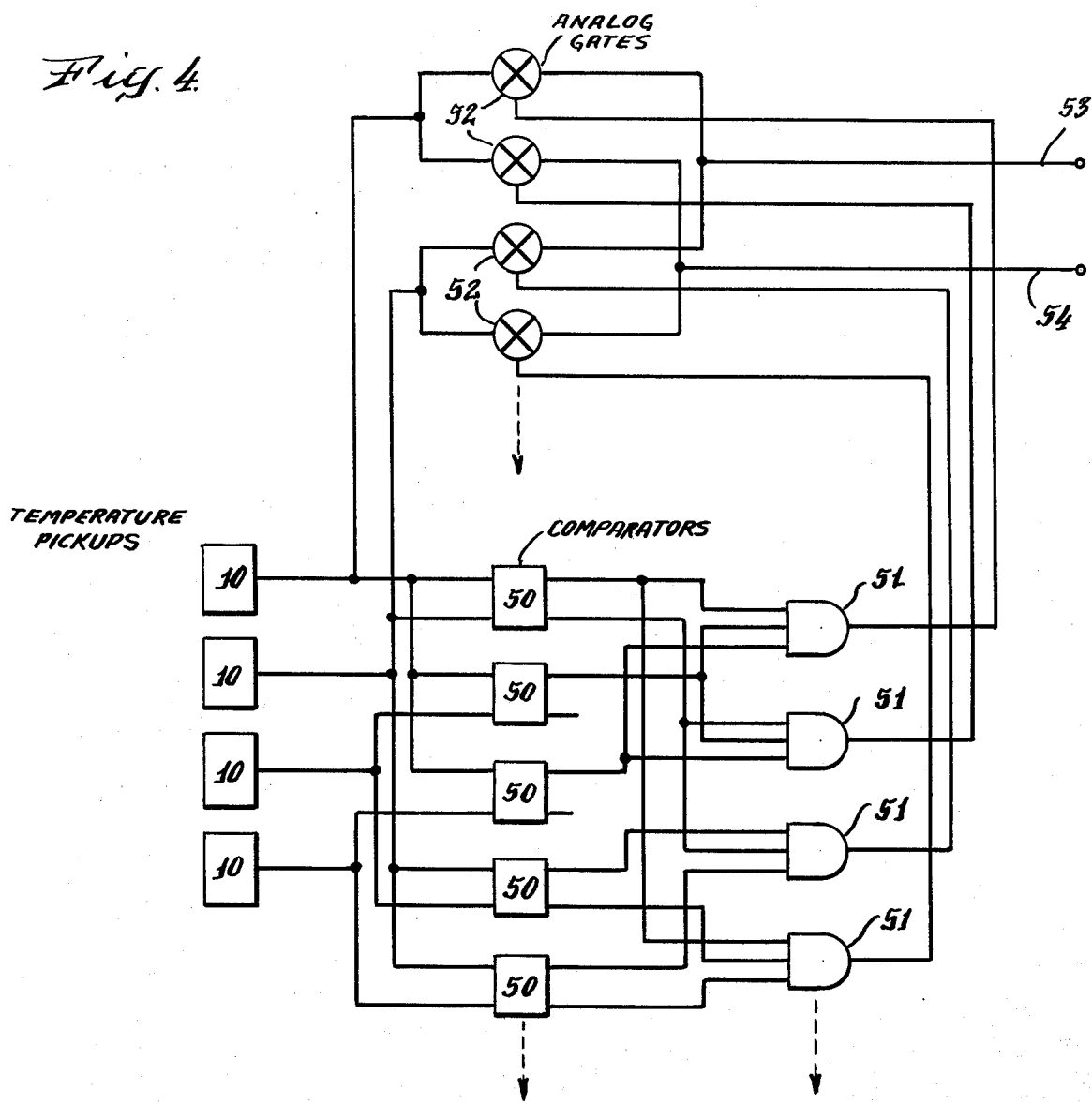
FIG. 4 is a simplified illustration of circuits that may be employed for the selector of the present invention.

It will of course be apparent that any conventional techniques may be employed for determining the high value, low value, or mean value of the outputs of the temperature detectors 10. For example only, as illustrated in FIG. 4, the outputs of each pair of temperature detectors 10 may be connected to a separate comparator 50 to produce logical signal outputs responsive to which of the input analog signals has a greater amplitude. The comparators 50 may thus be in the form of Schmitt trigger circuits. The outputs of the comparators 50 are selectively connected to AND gates 51, so that, for example, separate control signals are produced wherein any given temperature detector is determined to have the highest, or lowest value. The control signals may be connected to conventional analog gates 52, so that the output of any temperature detector may be controlled to be selectively connected to an output line 53 corresponding to the highest detected level, or an output line 54 corresponding to the lowest detected temperature. The circuit illustrated in FIG. 4 thus is of a type that may be employed for the comparator 21 of FIGS. 2 and 3, or, generally, the selector 11 of FIG. 1.

Figure 5:
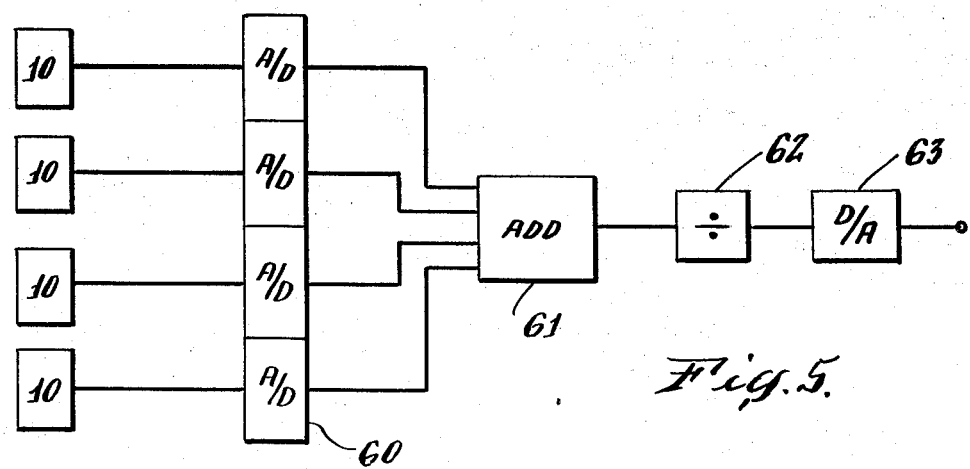
FIG. 5 is a block diagram of a modification of a portion of the system of FIG. 4.

FIG. 5 illustrates a manner by which the mean temperature may be selected, as an alternative to the maximum temperature selection provided by the system of FIG. 4. Thus, for example, the outputs of the wheel bearing temperature detectors 10 may be converted to digital form in an analog to digital convertors 60, the outputs of the convertors 60 being conventionally digitally added in adder 61, the sum being digitally divided in the divider 62 by a factor corresponding to the number of temperature detectors 10 employed, with the resultant being reconverted to analog values by the digital to analog converter 63. It will of course be apparent that the selection of the mean value may also be effected by solely analog techniques, and that, if desired, the selection of the high, low, mean and threshold values may alternatively be implemented by conventional software techniques.

In the method and apparatus in accordance with the invention, all functional changes in wheel bearings during the running of the vehicle may be detected, so that an early warning of the possibility of damage may promptly by given. The warning signals are directly transmitted to locomotive personnel, in a railway system, so that the necessary immediate action can be taken, and avoidance of damage to the wheel bearings, as well as accidents, is possible.

Other variations, alternatives and modifications within the scope of the invention will be apparent to those skilled in the art.

What is claimed is:

1. In a method for advance indication of the possibility of damage occurring to wheel bearings of vehicular means having a plurality of wheels, including the steps of monitoring the temperature of the wheel bearings with temperature detectors fixedly mounted at the wheel bearings, and producing indication signals when a temperature detected by a temperature detector exceeds a determinable value; the improvement wherein said step of monitoring comprises monitoring the temperature of a plurality of wheel bearings of said vehicular means, deriving a selected value from said plurality of monitored temperatures, obtaining, as an inverse function of ambient a further temperature reference value of said vehicular means monitored by one temperature detector mounted on said vehicular means spaced from wheel bearings thereof, and comparing said derived selected value with said further temperature reference value to produce said advance indication signal.

2. The method of claim 1, wherein said step of deriving said selected value comprises deriving said selected value as the maximum value of the plurality of monitored temperatures.

3. The method of claim 1, wherein said step of deriving said selected value comprises deriving the average value of said plurality of monitored temperatures.

4. The method of claim 1, wherein said vehicular means is a railway train, and said step of deriving comprises deriving said derived selected value from the temperatures of wheel bearings on a plurality of railway cars of said railway train.

5. The method of claim 1, wherein said vehicular means comprises a railway car, and said step of deriving comprises deriving said selected value from a plurality of wheel bearings on a truck of said railway car.

6. The method of claim 1, further comprising indicating the temperature of each said wheel bearing.

7. The method of claim 1, further comprising indicating the exceeding of the temperature of each of said wheel bearings above a determined temperature limit.

8. The method of claim 1, further comprising comparing the temperatures of said wheel bearings with each other, and providing an indication where the results of any of said last mentioned comparisons exceeds a given permissible temperature difference.

9. The method of claim 1, further comprising heating at least one of said temperature detectors to a determined level before monitoring the temperature thereof.

10. The method of claim 9, wherein said step of heating comprises passing an electric current through said last mentioned temperature detector.

11. In an apparatus for the advance indication of the possibility of damage occurring to the wheel bearings on a vehicle wherein means are provided for mounting a plurality of first temperature detectors to provide first signals corresponding to the temperatures of separate wheel bearings of said vehicle; the improvement comprising a separate second temperature detector for mounting on said vehicle at a location spaced from a wheel bearing to provide a second temperature signal, compensation means coupled to said second detector for compensating for extremes in detected temperature and providing a second signal, means for deriving a selected signal as a function of said first signals, and means for comparing said selected signal with said second signal to provide said advance indication.

12. The apparatus of claim 11, wherein said means for deriving a selected signal comprises means for selecting the first signal corresponding to the maximum temperature of wheel bearings detected by said first temperature detectors.

13. The apparatus of claim 11, wherein said means for deriving comprises means for producing a selected signal corresponding to the average temperature of said wheel bearings.

14. The apparatus of claim 11, wherein said selected signal deriving means comprises means for deriving a further selected signal as a further function of said first signals, said further function being different from said first mentioned function, and further comprising a comparator coupled to receive said first mentioned selected signal and said further signal for producing an additional advance indication of the possibility of damage to said wheel bearings.

15. The apparatus of claim 14, further comprising separate indicator means coupled to said first temperature detectors for indicating separately the temperatures of said wheel bearings.

16. The apparatus of claim 14, further comprising means coupled to said first temperature detectors for indicating when the temperature of the respective wheel bearings exceeds a given threshold temperature.

17. The apparatus of claim 11, wherein said vehicle comprises a railway vehicle.

18. The apparatus of claim 17, wherein said second temperature detector is mounted on a truck of said railway vehicle.

19. The apparatus of claim 11, wherein said compensation means comprises a function generator for producing said second signal as a function of the temperature of said second temperature detector.

20. The temperature of claim 11, wherein said means for deriving comprises first comparing means for producing a third signal corresponding to the maximum wheel bearing temperature, and a fourth signal corresponding to the minimum wheel bearing temperature, said compensation means comprises a function generator coupled to said second temperature detector for producing said second signal as a function of ambient temperature and said means for comparing produces said advance indication when said selected signal exceeds said second signal by a determined difference value.

21. The apparatus of claim 20, comprising an additional comparing means for comparing said third and fourth signals to produce an additional indication of the possibility of damage when the difference thereof exceeds a given threshold value.

22. The apparatus of claim 11, further comprising indicator means coupled to said first temperature detectors for providing a warning indication and an alarm indication responsive to different temperature of said first temperature detectors.

23. The apparatus of claim 11, further comprising testing means for testing the operation of said apparatus, said testing means comprising means for artificially heating said temperature detectors.

24. The apparatus of claim 23, wherein said heating means comprises electrical heating means.

25. The apparatus of claim 24, further comprising changeover switch means for selectively applying heating voltages to said temperature detectors, and separate indicators selectively coupled to said first temperature detectors by way of said changeover switches.

26. The apparatus of claim 25, further comprising means for automatically disconnecting the heating voltages from said temperature detectors when the temperatures thereof reach a determined temperature level.

* * * * *